(12) United States Patent
Bourret

(10) Patent No.: US 8,150,234 B2
(45) Date of Patent: Apr. 3, 2012

(54) METHOD AND SYSTEM FOR VIDEO QUALITY ASSESSMENT

(75) Inventor: Alexandre J Bourret, Paris (FR)

(73) Assignee: British Telecommunications public limited company, London (GB)

( * ) Notice: Subject to any disclaimer, the term of this patent is extended or adjusted under 35 U.S.C. 154(b) by 362 days.

(21) Appl. No.: 12/594,436

(22) PCT Filed: Feb. 27, 2008

(86) PCT No.: PCT/GB2008/000647
§ 371 (c)(1),
(2), (4) Date: Oct. 2, 2009

(87) PCT Pub. No.: WO2008/119924
PCT Pub. Date: Oct. 9, 2008

(65) Prior Publication Data
US 2010/0053336 A1    Mar. 4, 2010

(30) Foreign Application Priority Data
Apr. 3, 2007 (GB) .................................. 0706496.7

(51) Int. Cl.
*H04N 5/94* (2006.01)
*H04N 9/88* (2006.01)
*H04N 17/00* (2006.01)
*H04N 17/02* (2006.01)

(52) U.S. Cl. .......................... 386/263; 386/270; 348/180

(58) Field of Classification Search .......... 386/263–272, 386/326–342, 180–194
See application file for complete search history.

(56) References Cited

U.S. PATENT DOCUMENTS

| 6,377,297 | B1 | 4/2002 | Janko et al. |
| 6,433,819 | B1 | 8/2002 | Li et al. |
| 2011/0025857 | A1* | 2/2011 | Seigneurbieux ............... 348/192 |

FOREIGN PATENT DOCUMENTS

| EP | 1 021 040 | 7/2000 |
| EP | 1107614 A2 | 6/2001 |
| EP | 1 636 755 | 3/2006 |
| WO | 2004/114215 | 12/2004 |

OTHER PUBLICATIONS

Search Report dated Jul. 24, 2007 in Application No. GB0706496.7.
Written Opinion of the International Searching Authority mailed Jun. 19, 2008 in PCT/GB2008/000647.
International Search Report for PCT/GB2008/000647, mailed Jun. 19, 2008.

* cited by examiner

*Primary Examiner* — Thai Tran
*Assistant Examiner* — Hung Dang
(74) *Attorney, Agent, or Firm* — Nixon & Vanderhye P.C.

(57) ABSTRACT

A system and method for evaluating a video signal comprising a plurality of video frames. In the plurality video frames, the number of pixels changed from one frame to the next are analysed and each frame is identified as being a repeat if a set proportion of the pixels present in the current frame match those present in the previous frame. The resultant pattern of repeat frames in the video signal is recorded. The resultant pattern is then scanned to determine whether or not a given repeat frame is part of a temporally repetitive pattern and those repeat frames not determined to be part of the temporally repetitive pattern are identified. As result of the above, video quality assessment is able to treat these two types of temporal artefact separately so as to distinguish between the almost invisible regular frame loss and the visually disturbing irregular frame loss.

15 Claims, 5 Drawing Sheets

METHOD AND SYSTEM FOR VIDEO QUALITY ASSESSMENT

This application is the U.S. national phase of International Application No. PCT/GB2008/000647, filed 27 Feb. 2008, which designated the U.S. and claims priority to Great Britain Application No. 0706496.7, filed 3 Apr. 2007, the entire contents of each of which are hereby incorporated by reference.

The present invention relates to a method and system for assessing the quality of a video signal and assessing, in particular, the influence of repeated frames on the video signal quality.

Video quality testing has been performed for many years. Prior to the advent of digital compression techniques for video, formal subjective testing had been used with a relatively stable set of standard methods. In brief, a number of non-expert observers are selected, tested for their visual capabilities, shown a series of tests scenes for about 10 to 30 minutes in a controlled environment, and asked to score the quality of the scenes in one of a variety of manners. Usually, for full reference testing, the reference sequence is shown first, followed by the sequence under test, and the viewer is asked to rate the sequence under test with respect to the reference sequence. Further details of subjective measurements can be found in the relevant standard ITU-R BT.500 "Methodology for the Subjective Assessment of the Quality of Television Picture". This standard was first issued in 1974 and is formally known as CCIR Rec.500, and version 7 of this document covers the past proposed methods for subjective testing.

There are some advantages of subjective testing using human viewers, in that valid results may be produced for both conventional and compressed television systems, and it can work well over a wide range of still and motion picture applications. However, there are clear disadvantages in that the precise set up of the test can affect the result obtained, that meticulous set up and control are required and that in order to obtain statistically significant results a great many human viewers must be selected and screened. These disadvantages render subjective testing complex and time consuming, with the result that whilst subjective tests may be applicable for development purposes, they do not lend themselves to operational monitoring, production line testing or the like.

In order to get around the disadvantages of human subjective testing as described above, therefore, it is also known in the art to provide for the automatic assessment of video quality, using automated, and usually computer based, video comparison techniques. A prior art system which performs automatic picture quality analysis is the PQA 300 system from Tektronix Inc of 14200 S W Karl Braun, P.O. Box 500, Beaverton, Oreg. 97077 USA. The PQA 300 works by measuring a two second portion of a five second video test sequence. The video test sequences may be downloaded from CD ROM or recorded from video, and played out to the system under test. The output of the system under test is then stored and analysis thereof performed with DSP accelerated hardware on the two second sequence. The measurement results in a single numeric value of picture quality called the "picture quality rating". The PQA 300 employs a human vision system model known as JND Metrix and performs three different types of analysis of the video information, being spatial analysis, temporal analysis, and full colour analysis, in order to generate the picture quality rating. Additionally, the PQA 300 provides PSNR values which are displayed in the form of an animated map whose intensity is related to the PSNR differences between the reference and the test images. In summary therefore, the PQA 300 is able to analyse test and reference video sequences in order to generate a video quality value, as well as PSNR measurements.

Problems can arise, however, with straightforward comparisons of test and reference sequences to generate the quality metrics mentioned above. For example, a significant source of perceptible quality degradation in video signals derives from temporal artefacts, i.e. where a frame is repeated in place of an original frame that has been lost. One source of frame repetition is transmission error, which can cause the video signal to freeze for a variable period of time. Buffer overflow and underflow can result in a similar effect. However, with the advent of transmission techniques designed for lower-bandwidth systems (for example: video streaming on mobile phones), a new set of temporal artefact has appeared. These are created by the use of temporal sub sampling to reduce the overall information for transmission. The effect on the video stream can be described as a periodic frame loss, or regular frame repeats which become evident when comparing the reference signal with the degraded one. Although often imperceptible to the user, these regularly repeated frames are a problem for quality assessment systems, since they create a series of error bursts. In addition, the pattern of these repeated frames can be complex. Finally, the effects of temporal sub sampling overlaps with real transmission errors, as described previously.

The present invention addresses the above identified problem by providing a method and system for automated video quality assessment that allows for temporal artefacts to be identified and to discriminate between regular frame-repeats characteristic of temporal sub sampling and irregular frame-repeats characteristic of malfunction.

More particularly, the invention provides for a method of evaluating a video signal comprising a plurality of video frames, the method comprising:
1) in the plurality video frames, analysing the number of pixels changed from one frame to the next;
2) identifying a frame as being a repeat if a set proportion of the pixels present in the current frame match those present in the previous frame;
3) recording a pattern of repeat frames in the video signal;
4) scanning the pattern to determine whether or not a given repeat frame is part of a temporally repetitive pattern;
5) generating an indicator of quality by identifying those repeat frames not determined to be part of the temporally repetitive pattern;
6) scanning the pattern by establishing a first window of multiple frames referenced in the pattern to a first frame and a second window of equal size in the pattern;
7) arranging the second window at an offset relative to the first window;
8) comparing the patterns of repeat frames in the first and second windows and recording the number of mismatches between the patterns;
9) repeating the comparison for each value of offset over range of offsets and recording the results;
10) selecting a new value of window size for the first and second windows, repeating the comparisons over the range of offset values and recording the results;
11) determining a target window size that provides the least variation in mismatch values over the range of offset values.

The method preferably further comprises, the step of generating an indicator of quality by comparing the pattern of repeat frames in a first section whose size is determined by the size of the target window with the pattern of repeat frames in a number of second sections of the same size and recording the number of times a mismatch occurs between the pattern in the first section and the patterns in each of the second sections.

Preferably, the method includes the step of combining the indicator of quality with one or more known indicators of quality to produce a perceived mean opinion score.

In embodiments of the invention, the analysing is performed on a section of each frame and the section excludes the edges of the frame. In as aspect of the invention, each frame comprises a plurality of pixels. In a preferred embodiment two pixels from adjacent frames are identified as matching if the pixel in the first frame is within a predetermined threshold of the corresponding pixel in the second frame.

In embodiments of the invention, the decision mechanism uses a threshold on each pixel and if all pixels in a frame are within a predetermined threshold of the corresponding pixels in the previous frame, the frame is identified as a repeat.

Additionally, from a yet further aspect the invention also provides a computer program or suite of programs so arranged such that when executed by a computer system it/they cause/s the system to perform the method of any of claims.

The invention also provides a system for evaluating a video signal comprising a plurality of video frames, in which the system comprises: means for detecting repeat frames by analysing the number of pixels changed from one frame to the next; and for recording a pattern of repeat frames; means for scanning the pattern to determine whether or not a given repeat frame is part of a temporally repetitive pattern and for generating an indicator of quality by identifying those repeat frames not determined to be part of the temporally repetitive pattern.

Preferably, the means for scanning the pattern comprises: means for establishing a first window of multiple frames referenced in the pattern to a first frame and a second window of equal size in the pattern; in which the second window is arranged at an offset relative to the first window; in which the means for scanning the pattern further comprises: means for comparing the patterns of repeat frames in the first and second windows and recording the number of mismatches between the patterns; means for repeating the comparison for each value of offset over range of offsets and recording the results; means for selecting a new value of window size for the first and second windows, repeating the comparisons over the range of offset values and recording the results and; means for determining a target window size that provides the least variation in mismatch values over the range of offset values.

In a preferred embodiment, the system comprises means for generating an indicator of quality by comparing the pattern of repeat frames in a first section whose size is determined by the size of the target window with the pattern of repeat frames in a number of second sections of the same size and for recording the number of times a mismatch occurs between the pattern in the first section and the patterns in each of the second sections.

In a preferred embodiment, the system further comprises means for combining the indicator of quality with one or more known indicators of quality to produce a perceived mean opinion score.

Further features and advantages of the present invention will become apparent from the following description of embodiments thereof, presented by way of example only, and by reference to the accompanying drawings, wherein like reference numerals refer to like parts, and wherein.

Figure 7:
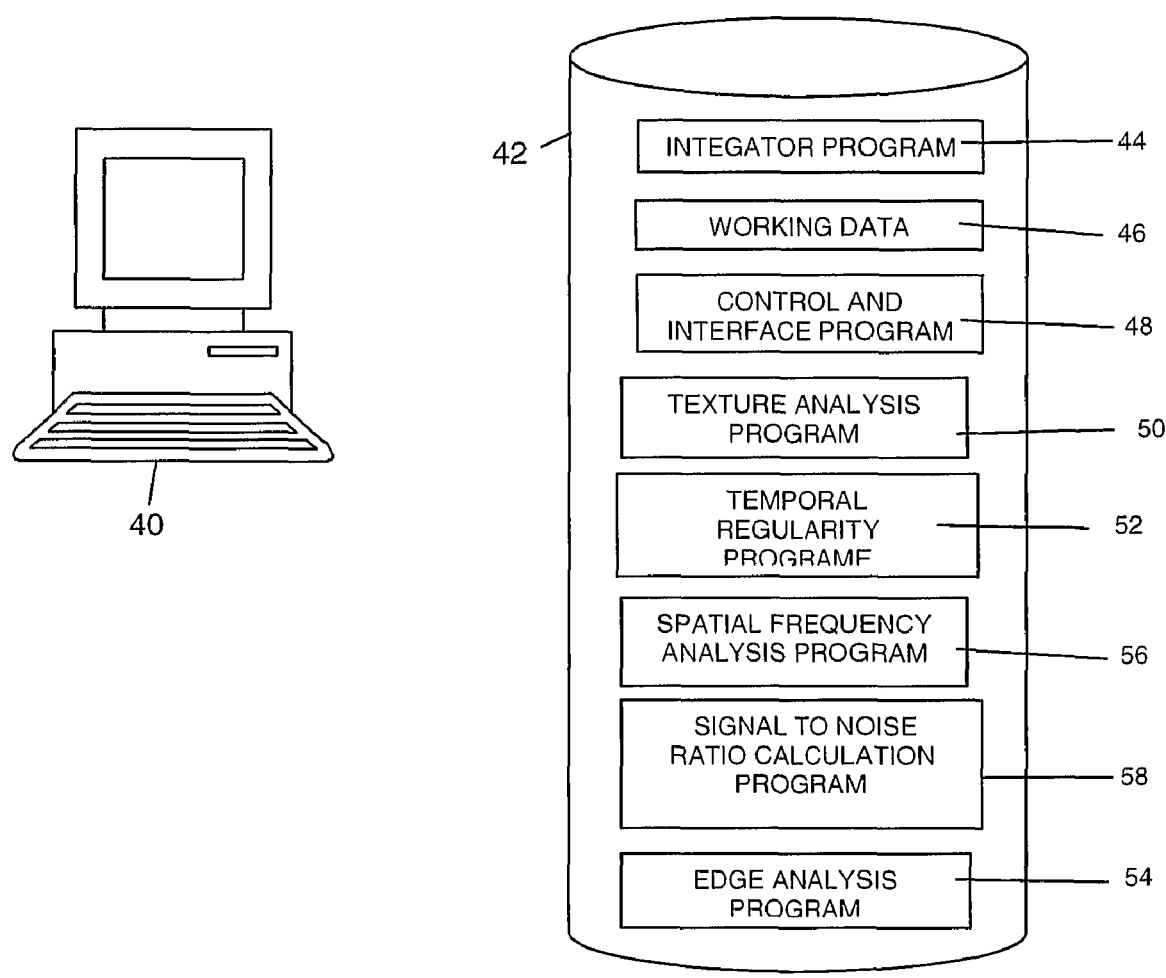

FIG. 7; is a diagram illustrating a second, software-based embodiment of the present invention.

Figure 1:
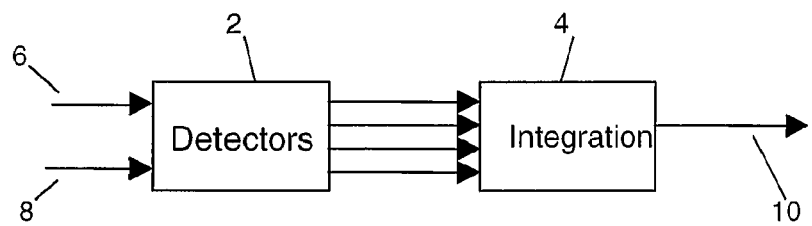
FIG. 1 is an overall block diagram of the system of the present invention.

FIG. 1 illustrates an overall system block diagram of the general arrangement of the embodiments of the invention. Within FIG. 1 a reference sequence 8 comprising reference sequence fields/frames is input to a detector module 2. Similarly, a test sequence or degraded sequence 6 of video fields/frames is also input in to the detector module 2. The test sequence is obtained by inputting the reference sequence to a system to be tested (such as a video recording device, a broadcast system, or a video codec, for example), and then taking the output of the system under test as the test sequence. The detector module 2 acts to detect various video characteristics of the input reference and test video fields/frames and generates video characteristic values which are then output to an integration module 4. The integration module 4 integrates the video characteristics values together to give a predicted video quality value 10, which is output therefrom.

Figure 2:
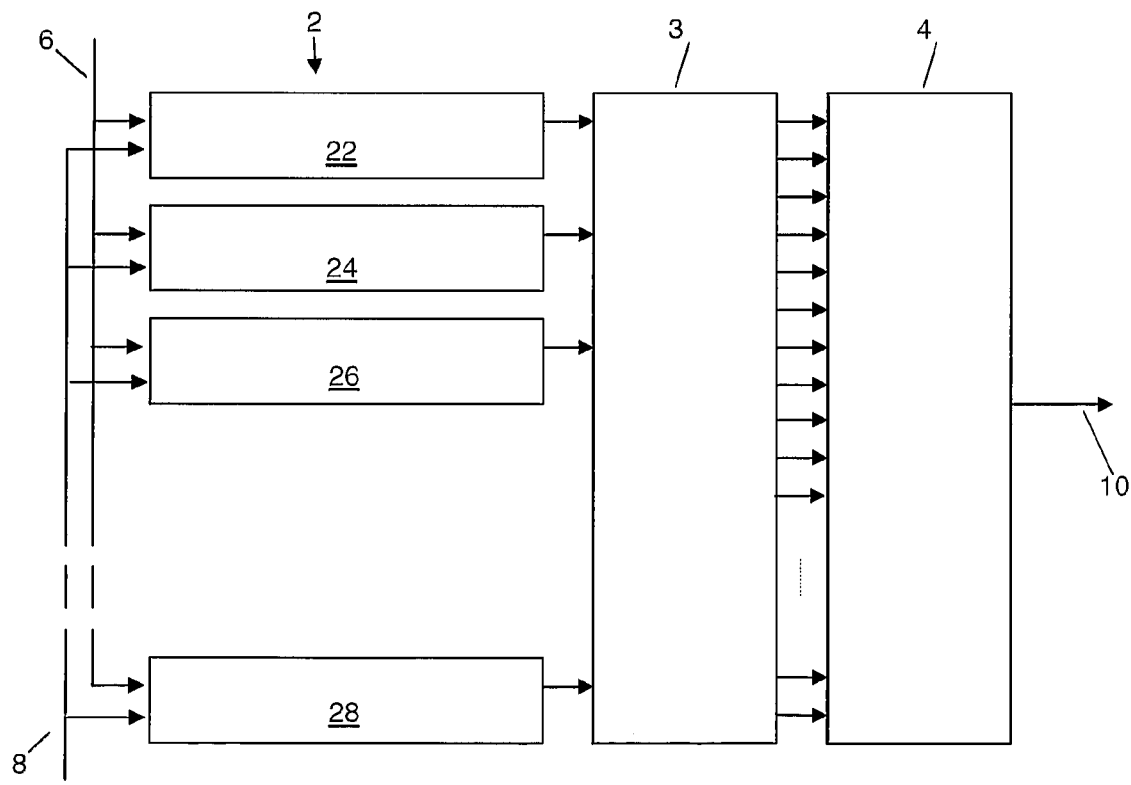
FIG. 2 is a block diagram showing the system of FIG. 1 in greater detail.

As shown in FIG. 2, the degraded video sequence 6 is input to the degraded sequence inputs of a number of analysers 22-28. The selection of analysers used may depend on the application. Known analysers include a spatial frequency analyser; a luminance and chrominance peak signal-to-noise ratio (PSNR) analyser; an edge-detector analyser, and a texture analyser. The purposes and operations of these known analysers will be briefly outlined below but a full description is available, in patent publication EP 1636755. The present invention advantageously provides an additional form of analysis in the form of a temporal regularity analyser to be described in detail, later. An example of an application in which certain analysers may be omitted is the real-time assessment of signals at a mobile telephone. Due to the limitations of current mobile handsets, some processor-intensive operations, such as texture analysis, may be omitted Of the types of known analyser modules referred to above, the spatial frequency analyser acts to analyse the input test video fields/frame and reference video fields/frames and generates pyramid SNR values PySNR(a, b) from a pyramid analysis of the input reference fields/frame and the test field. Additionally, the luminance and chrominance PSNR analyser compares the input reference field and the input test field to generate luminance and chrominance PSNR values which are then output. Similarly, the edge detector analyser analyses the input reference field and the input test field and outputs a single edge detector value EDif. Finally, the texture analyser analyses the test field to calculate a parameter TextureDeg indicative of the texture within the frame. The operations of each of these known analysers, i.e. spatial frequency analyser, the luminance and chrominance peak signal to noise ratio analyser, the edge detector analyser, and the texture analyser are described in more detail in patent publication EP 1636755.

Figure 3:
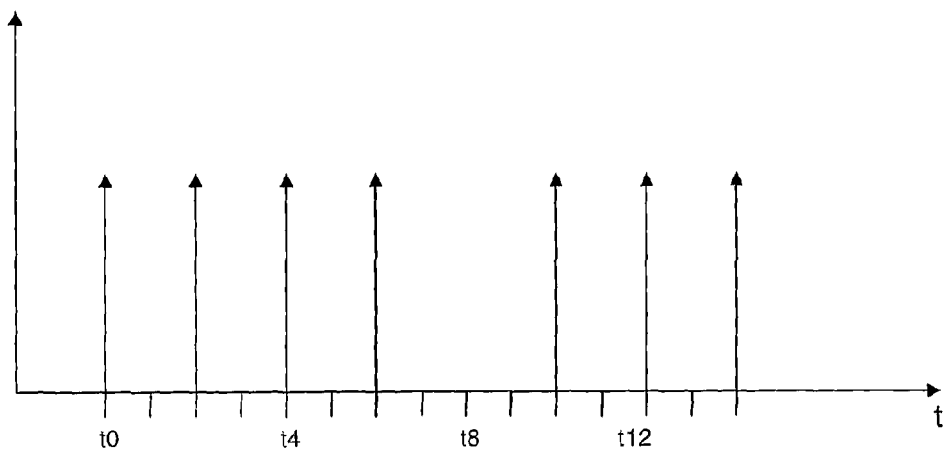
FIG. 3 is a diagram illustrating a video signal after down-sampling for input into an embodiment of the present invention.

FIG. 3 shows a sequence of frames from a video signal that has been temporally down-sampled (bandwidth reduced). The horizontal axis represents time while the vertical access indicates the presence or absence of frames where the presence of a frame is indicated by a vertical arrow at the appropriate point on the time-axis and a missing frame is indicated by no vertical arrow at the appropriate time point. The down-sampling works by removing frames from the video sequence at regular intervals; so reducing the number of frames per second carried by the video signal. The effect of this down-sampling, in the example of FIG. 3, is the removal of a frame at times t1, t3, t5, t7, t9 and so on. It will be noted that another frame is missing at time t8. The frame missing at time t8 does not form part of the regular sequence of lost frames resulting from the down-sampling but is the result of a random error. The goal of this invention is to recognise this type of random missing frame as a separate event from the regular loss of frame due to the down-sampling. The next step in quality assessment, exploiting the invention, will be to process these two temporal artefacts as distinct and of different subjective significance The first step in the algorithm is to create a time line, stored in a buffer, which indicates for each time slot of the video sequence whether the frame is a repeat of the previous one. Repetition is judged on whether the current frame has new visual content or content similar to the previous frame. This is done by analysing the number of pixels changed from one frame to the next. According to a preferred embodiment, this analysis is performed on a section of the overall frame, called the active frame, in order to ignore any extraneous information at the borders of the frame. It is known to include for operational reasons extra information (such as time code information) in the frame borders that is not be related to the video content. Restricting the analysis to the active frame avoids spurious results caused by this extraneous information. If all pixels in the current active frame (t1) are identical to those present in the previous frame, the current frame is tagged as being a repeat.

In situations where the video processing chain contains an analogue component, the decision mechanism can be improved by establishing a threshold value for each pixel. If each pixel value is within the threshold of the value of the corresponding pixel in the previous frame, the frame is tagged as repeated. We therefore generate a series of tags, one per frame, collated in an array indicating the presence of repeated frames.

Figure 4A:
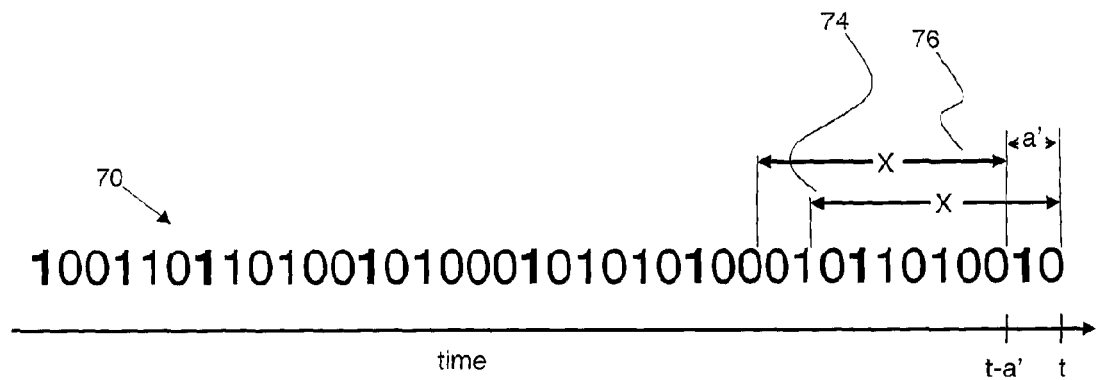
FIGS. 4a, 4b and 4c are diagrams illustrating the analysis of a series of tags according to an embodiment of the present invention.

The next step is to determine whether or not a given repeated frame is part of a cycle (e.g. resulting from down-sampling) or was generated by another effect. To achieve this, first, the series of tags is analysed, looking for temporally repetitive patterns of frame loss. Once a temporally repetitive pattern has been identified; the remaining repeated frames that do not form part of the pattern are then identified as resulting from a malfunction. According to an embodiment of the invention, the following algorithm is repeated to process these tags:

The analysis of a series of tags according to the invention will now be described with reference to FIG. 4a. FIG. 4a shows a sequence 70 of tags indicating repeated and new frames by a 1 and a 0, respectively. In the Figure, a regular pattern of repeat frames (as may be caused by down-sampling the video signal) is indicated by emboldened 1s. To analyse the series of tags (represented in the Figure by string of 1s and 0s 70), a reference analysis window 74 is set at position t with an initial size X equal to Xmax tags (with each tag representing one frame). A second, offset analysis window 76 is set at initial position t-a in the series of tags, where a is a temporal offset. Offset analysis window 76 is set with an initial size X identical to the reference window 74 size of Xmax tags.

The pattern of "repeat tags" (i.e. tags indicating a repeated frame in the sequence) falling within the reference window 74 at position t in the series of tags is recorded and is compared with the pattern of repeat tags falling within offset window 76 at position t-a. It might help to give an example, with reference to the sequence of tags illustrated in FIG. 4a. If we interpret the 1s and 0s so that a 1 indicates a repeated frame and a 0 indicates a new frame, the number of repeat tags in reference window 74 is four and the number in offset window 76 at a value of offset a equal to a' is also four. If we now look at the pattern of these tags, we find the following:

| Reference window 74 at position t | 0 | 1 | 1 | 0 | 1 | 0 | 0 | 1 | 0 |
|---|---|---|---|---|---|---|---|---|---|
| Offset window 76 at position t-a' | 0 | 1 | 0 | 1 | 1 | 0 | 1 | 0 | 0 |
| Match: reference v. offset? | Y | Y | N | N | Y | Y | N | N | Y |

Hence we find, for a window size of X and at an offset of a', five tags in offset window 76 match the corresponding tag in reference window 44.

Figure 4B:
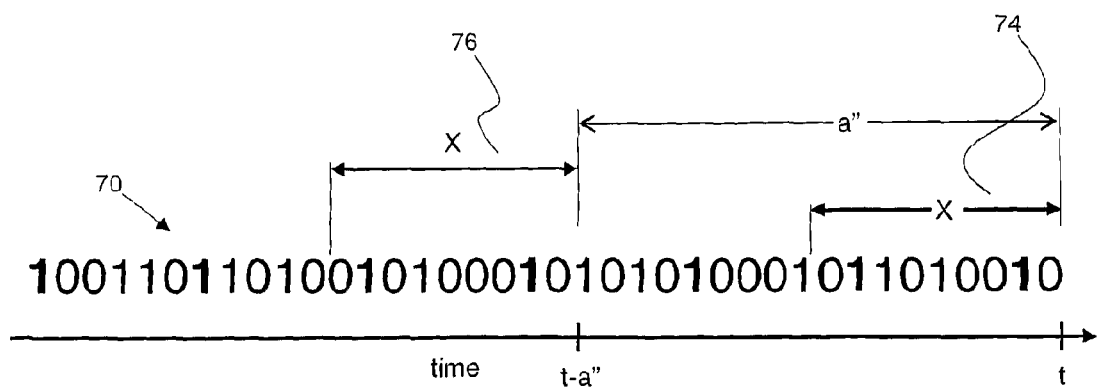

The offset value a is then incremented successively and the comparison of tag pattern in the reference and offset windows repeated until the offset a reaches a predetermined maximum value, amax. FIG. 4b shows an intermediate stage where the value of offset a has been incremented to value a" and offset window 76 contains three repeated frame tags. If we now look at the pattern of these tags for an offset of a", we find the following:

| Reference window 74 at position t | 0 | 1 | 1 | 0 | 1 | 0 | 0 | 1 | 0 |
|---|---|---|---|---|---|---|---|---|---|
| Offset window 76 at position t-a" | 0 | 1 | 0 | 1 | 0 | 0 | 0 | 1 | 0 |
| Match: reference v. offset? | Y | Y | N | N | N | Y | Y | Y | Y |

Hence we find, for a window size of X and at an offset of a", six tags in offset window 76 match the corresponding tag in reference window 44.

The results of the comparisons are stored in an accumulator, for each value of offset a. Once the offset window has reached the end of the range, i.e. offset a has reached a maximum value, amax, the operation is repeated starting with the initial offset value of a' but with the size X of the reference and offset windows decremented to Xmax-1. The results of the comparisons are stored in an accumulator array, for each value of window size X. The maximum value of temporal offset a is chosen depending on the data to be analysed and may take a range of values to include a value of around one second for high-quality video and around ten seconds for lower frame-rate and greater complexity (for example for a video signal for mobiles).

This loop is repeated until window size X reaches a minimum value Xmin. At this point, the accumulator contains a two-dimensional array of data, as follows: for each value of window size X, an indication of how the pattern of repeated frames in the reference and offset windows match over the range of offset values a, i.e. over the sample of frames. The analysis now goes on to process this data to determine what is the best value for X and, inherent in this, what is the most likely length of the periodic frame loss pattern.

For each value of window size X, the accumulator array is checked for regularity. For a given value of X, a counter is incremented every time there is a difference between the pattern of repeated frames in the reference and offset frames. A best value X' of window size is then selected, based on the smallest number of mismatches. In case there are two or more values for X that score equally well on this basis, the largest value is selected. The selected value X' gives the predicted size of the repetitive pattern of lost frames.

Once this value for the size of the repetitive pattern of lost frames has been determined, it is used in calculating auto correlation in the sequence of tags, described above, indicating which frames are repeated and which are new. The result of this correlation provides an error indicator for use in the next stage.

Figure 4C:
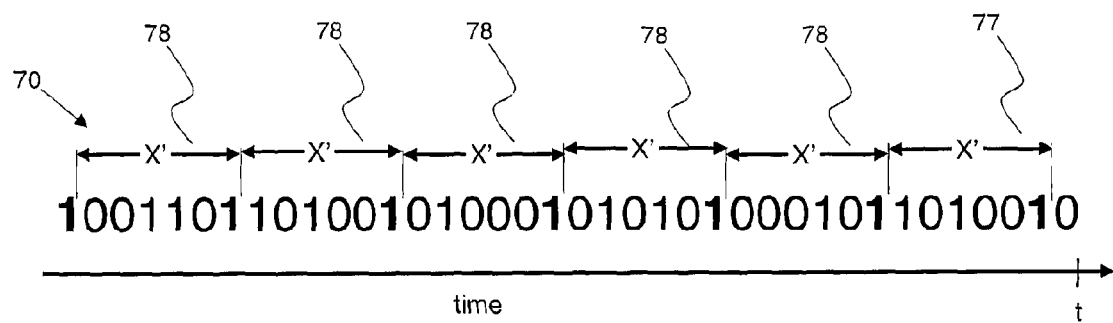

In more detail, the value X' of window size determined by the operation described above is then exploited, as follows, in order distinguish between regular and irregular frame repeats. The sequence 70 of tags is analysed in a further stage using the selected window size X'. As illustrated in FIG. 4c, according to this stage of the analysis, the pattern of repeat frames contained in a first section 77 of length X' in sequence of tags 70 is compared with the patterns in adjacent sections 78 of similar length. In the example sequence of FIG. 4c, this gives the following patterns, starting from section 77 and moving back in time (towards the left in the Figure):

| | |
|---|---|
| reference section 77 | 101001 |
| $1^{st}$ section 78 | 000101 |
| $2^{nd}$ section 78 | 010101 |
| $3^{rd}$ section 78 | 010001 |
| $4^{th}$ section 78 | 101001 |
| $5^{th}$ section 78 | 001101 |

If we apply the comparison described above to the sections in the above example, we find that $1^{st}$ section 78 contains 3 mismatches with reference section 77; $2^{nd}$ section 78 contains 4 mis-matches with reference section 77; $3^{rd}$ section 78 contains 3 mismatches with reference section 77; $4^{th}$ section 78 contains 0 mis-matches with reference section 77; and $5^{th}$ section 78 contains 2 mismatches with reference section 77. It will be noted that the emboldened 1s in each section are aligned and so the corresponding, regular repeated frames disappears from the calculation.

The number of mismatched frames between the reference section 77 and the other sections 78 is then summed. The result of this summation provides an error value for use in the next stage. Returning, once more, to the example of FIG. 4c, we find a total error value of 12, this being the sum total of mismatches between the reference section 77 and the other sections 78. The size of this sum is an indicator of signal quality with a low value indicating better quality.

The data derived from the above analysis may be exploited to improve the performance of the integration function 4 by allowing the influence of repeated frames to be taken into account but regularly repeated frames predicted by the selected window size to be disregarded. The subsequent steps of analysis are then able to concentrate on the non-periodic or irregular frame-repeats as indications of degraded perceived video quality.

The values extracted according to the invention are transmitted to the second stage of the model, where its integration function will use this information in the estimation of the mean opinion score (MOS). These values comprise the selected window size X', the error value, the error indicator and the matching values contained in the accumulator array for the chosen value of window size X'. Variations in the matching values indicate to the second stage the presence of abnormal variations in the pattern of frames.

According to a preferred embodiment of the invention, the relevance of each comparison is weighted according to age so that the weighting of a comparison between reference section 77 and an older one of the sections 78 will be lower than the weighting of a comparison between reference section 77 and a newer one of the sections 78.

Figure 5:
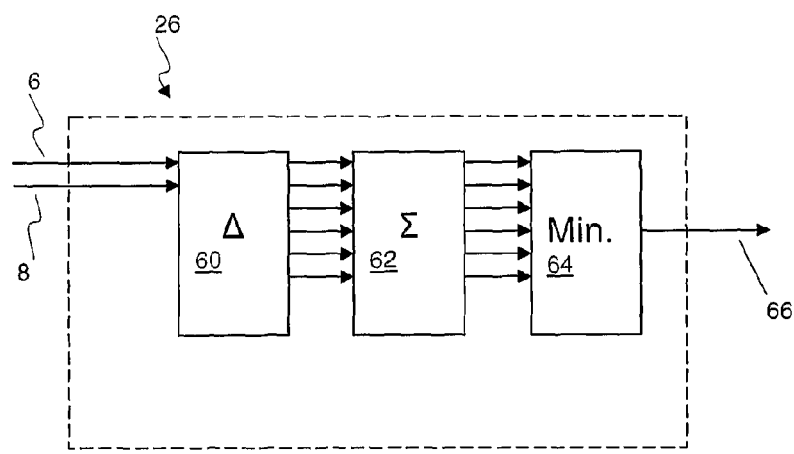
FIG. 5 is a system block diagram showing the individual parts of an analyser of the present invention.

The temporal regularity analyser 26 of FIG. 2 is shown in greater detail in FIG. 5. As shown here, temporal regularity analyser 26 consist of a number of functional blocks for analysing the sequence of tags, including difference analyser 60, analyser/summer 62 and minimum value selector 64. As already described with reference to in FIG. 2, temporal regularity analyser 26 receives two inputs: reference video sequence 8 and degraded video sequence 6. In difference analyser 60, the sequence of tags is generated indicating the location in the input video signals 6, 8 of repeat frames. In analyser/summer 62, the sequence of tags is analysed using windows of a range of sizes and the cumulative total of mismatches across the sequence is determined for each window size. In minimum value selector 64, the results from the summations in analyser/summer 62 are compared and the window size that corresponds to the minimum value is selected. The results are forwarded to Integrator 4 as shown at arrow 64.

The goal of this invention is to recognise this missing frame as a separate event from the regular loss of new frame due to the down sampling. As result of the above analysis of the video signal, the next stage in quality assessment is able to treat these two types of temporal artefact separately so as to distinguish between the almost invisible regular frame loss and the visually disturbing irregular frame loss.

Figure 6:
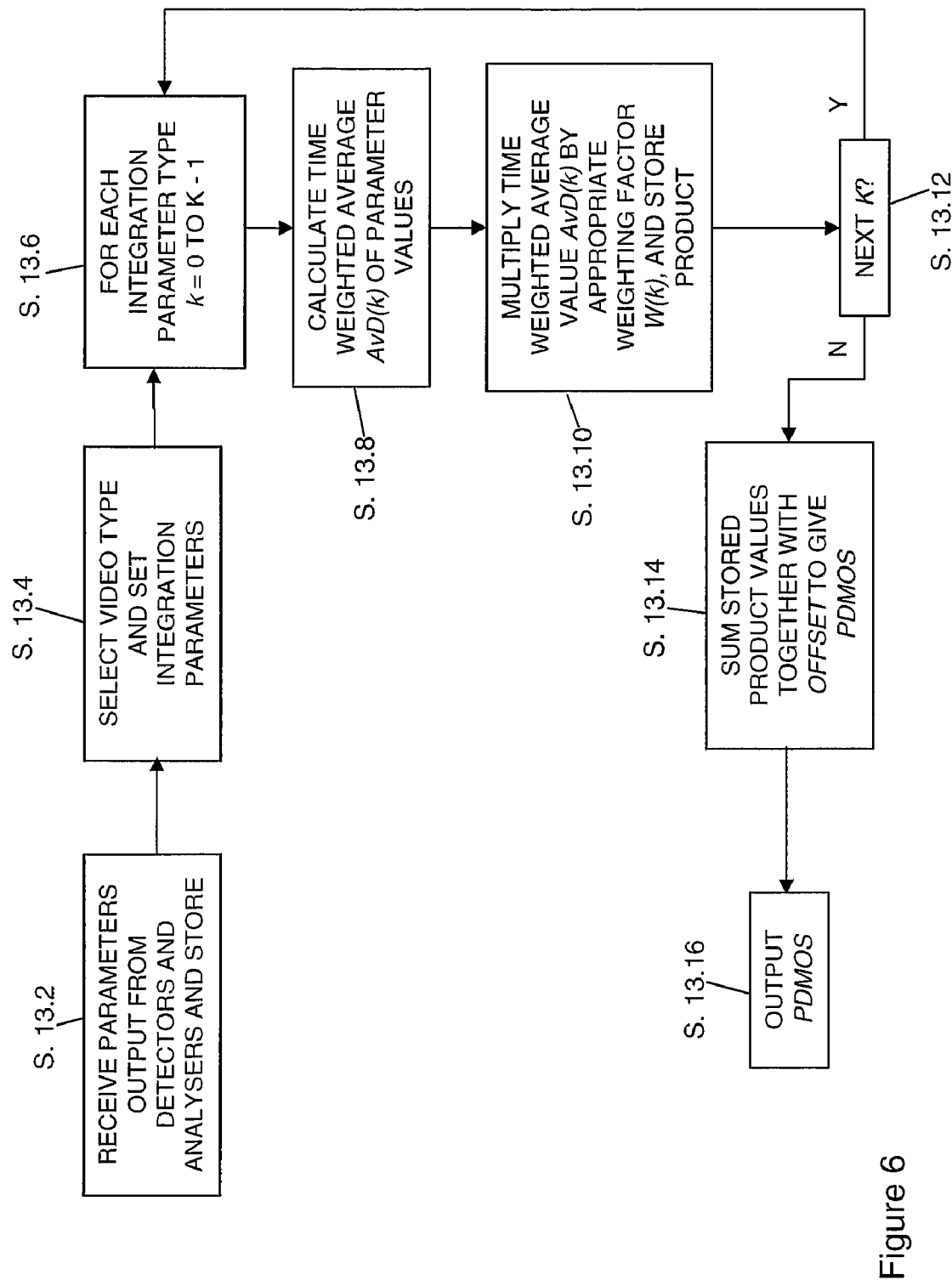
FIG. 6 is a flow diagram illustrating the steps performed by the integrator of the embodiment of the present invention.

The application of the invention to the integration function will now be described with reference to FIG. 2. Referring back to FIG. 2, it will be seen that the various outputs from the analysers 22 to 28 within detector module 2 are fed to an integration stage 4, wherein the various values are integrated together to give a video quality value 10. The operation of the integration stage 4 will now be described with respect to FIG. 6.

Generally, the integration stage operates to produce an estimate of the perceived video quality of the test video sequence by the appropriate weighting of a selection of the video characteristic parameter values produced by the analysers 22 to 28, including the temporal regularity analyser of the invention. The particular set of parameter values used and the values of the corresponding weighting factors depend upon the particular type of video being tested, and are determined in advance by prior calibration. The calibrations are performed on a large set of video sequences that have known subjective scores, and preferably have properties similar to the degraded sequences to be tested.

The general form of the integration procedure firstly time weights the field by field detection parameters, and then combines the time-weighted and averaged values to give a predicted quality score, being the overall video quality value. The process to achieve this is set out in FIG. 6.

Firstly, the integration stage 4 receives the parameter values output from the various detectors and analysers at step 13.2 and stores them. The various analysers output different parameters. Whatever parameters and values have been output by each of the earlier stages in respect of a particular test video field, the integration stage receives the output information and stores it.

Next, at step 13.4 the integration stage selects the video type, and as a result selects a set of integration parameters in dependence on the video type.

The precise values of the various weighting factors are determined in advance by calibration, as described. Moreover, each set of integration parameters is stored within the integration stage 4 in look-up tables or the like.

Having selected the video type and set the integration parameters from the stored look-up tables, at step 13.6 a processing loop is commenced in order to process each integration parameter type k within the values 0 to K−1, wherein each parameter (k) is a particular one of the parameters received from the various analysers. Within the processing loop, at step 13.8 firstly a time weighted average AvD(k) of the parameter values is calculated according to the following:

$$AvD(k) = (1/N) * \left( \sum_{n=0}^{N-1} D(k,n)^{mnk} \right)^{1/mnk} \quad (13\text{-}1)$$

where N is the number of fields, D(k, n) is the n'th field of the k'th detection parameter, and mnk is a weighting factor. Next, at step 13.10 the time weighted average value AvD(k) is multiplied by the appropriate weighting factor w(k), and the product stored. The appropriate weighting factor w(k) is read from the appropriate look up table for the video type stored in the integration stage 4.

At step 13.12 an evaluation is performed to determine whether or not all of the integration parameters (k) have been processed, and if not the processing loop of step 13.6 is performed again until all of the parameters have been processed. Once all the parameters have been processed then an appropriately weighted time weighted average value will be available for each type of parameter k, which are then summed together at step 13.14 with an offset value as follows $$PDMOS = \text{Offset} + \sum_{k=0}^{K-1} AvD(k) * W(k) \quad (13\text{-}2)$$

where K equals the number of parameters used in the integration. This gives a final video quality value PDMOS, which is then output at step 13.16.

The output video quality value PDMOS is equivalent to a rating produced by subjective testing using human observers, in that it has been produced taking into account distortions and errors in the test video signal which are substantially perceptually undetectable by human observers including, according to the present invention, temporal artefacts leading to repeated frames. In view of this property the video quality value PDMOS may be put to a number of uses. In particular, it may be used to evaluate the quality of an existing video service to ensure that the quality is adequate, or alternatively it may be used to test the performance of different video codecs. Additionally, the video quality value may be used to evaluate the performance of new video services, such as broadband-style video services over the Internet. In this respect, the video quality value PDMOS may be put to any use similar to those automated quality assessment values generated by the prior art, with the difference that as the value takes into account temporal artefacts, it is much more likely to represent a video quality value generated by human viewers during subjective tests then has heretofore been the case with prior art automated video quality assessment techniques.

FIG. 7 illustrates a second embodiment of the present invention, being one that is implemented in software. Here, the various processes provided by the present invention are performed by a computer 40, which is arranged to receive both the reference video sequence, and the test video sequence. The computer 40 is provided with a program storage device such as a hard disk drive, writable CD or DVD, memory or the like, in which are stored various computer programs which contain instructions which when executed by the computer 40 cause the computer to perform the present invention. More particularly, a control and interface program 48 is provided which when run allows a user of the computer to control the computer to begin to process test and reference video sequences in accordance with the invention, and to allow the computer to output the test results to the user on the screen. Such a control and interface program is preferably graphically based, and the arrangement of such a program would be apparent to one skilled in the art.

Additionally provided is an integrator program 44, a texture analysis program 150, a spatial frequency analysis program 156, a signal to noise ratio calculation program 158, an edge analysis program 54 and a temporal regularity analysis program 152 according to the present invention. The operations of each of these programs will be briefly discussed below in the context of an example operation.

Imagine that a user of the general purpose computer 40 wishes to test a video sequence. The user first of all starts the control and interface program 48, which provides controls to the user to allow the user to specify the test and reference video sequences to be processed. Once the user has instructed the computer 40 to commence processing via the control and interface program 48, the control and interface program 48 then causes the computer 40 to commence processing, by causing several of the other programs to be executed and to process data as appropriate. Therefore, upon receiving instructions from the user to commence processing the control and interface program 48 firstly initiates processing by spatial frequency analysis program 156. Spatial frequency analysis program 156 operates to perform spatial frequency analysis on the reference frames and the test frames in exactly the same manner as the spatial frequency analyser, previously described, so as to generate video characteristic values which are then stored in the working data portion 46 of the storage device 42.

Next, the control and interface program 48 launches the signal to noise ratio calculation program 158, which then accesses the test video fields/frames and the reference video frames within the working data portion 46, and calculates luminance and chrominance signal to noise ratios in the manner previously described. That is, the signal to noise ratio calculation program 158 operates in an identical manner to the luminance and chrominance peak signal to noise ratio analyser as previously described. The resultant luminance and chrominance signal to noise ratios calculated by the signal to noise ratio calculation program 158 are stored in the working data area 46 of the storage device.

The control and interface program 48 then launches the texture analysis program 150. The texture analysis program 150 then accesses the test video frames from the working data area 46, and acts to calculate video texture quality parameters in the same manner as previously described in respect of the texture analyser.

Following the operation of the texture analysis program 150, the control and interface program 48 then launches the edge analysis program 160. The edge analysis program acts to access the reference frames within the working data area 46 of the storage device 42, as well as the test video frames. Then, the edge analysis program 54 operates substantially as described previously in respect of the edge analyser. The output parameters of the edge analysis program are stored in the working area 46.

Following the operation of the edge analysis program 160, the control and interface program 48 then launches the temporal regularity program 152. The temporal regularity program acts to access the reference frames within the working data area 46 of the storage device 42, as well as the test video frames. Then the temporal regularity program acts to distinguish between a regular temporal pattern (with various level of complexity), and anomalous temporal artefacts in a manner similar to that described above with reference to FIGS. 4a and 4b.

At this stage in the operation of the second embodiment, each of the analysis programs has been executed, and the working area 46 therefore contains all of the video characteristic parameter values which may be used as inputs for an integrator. Therefore, the next operation is that the control and interface program 48 launches the integrator program 44, which acts to access the working area 46 to read the characteristic parameter values therefrom as appropriate, and to integrate the parameters together in order to generate the final video quality value PDMOS. The operation of the integrator program 44 is substantially identical to that of the integrator stage 4 as previously described. Therefore, the integrator program 44 operates substantially in accordance with the flow diagram of FIG. 6, as previously described.

The second embodiment of the invention therefore provides a software embodiment, which acts to generate the video quality value in substantially the same manner as previously described in respect of the first embodiment. It should be noted here, however, that the first embodiment as described may also be implemented in software or alternatively may be implemented with hardware elements or a mixture of both software and hardware. In this respect, the first embodiment should be considered to be a more general embodiment than the second embodiment.

Those skilled in the art will appreciate that the above embodiments of the invention are simplified. Those skilled in the art will moreover recognise that several equivalents to the features described in each embodiment exist, and that it is possible to incorporate features of one embodiment into other embodiments. Where known equivalents exist to the functional elements of the embodiments, these are considered to be implicitly disclosed herein, unless specifically disclaimed. Accordingly, the spirit and scope of the invention is not to be confined to the specific elements recited in the description but instead is to be determined by the scope of the claims, when construed in the context of the description, bearing in mind the common general knowledge of those skilled in the art.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Moreover, for the avoidance of doubt, where reference has been given to an earlier document, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

The content of the attached abstract is incorporated herein, as follows. A system and method for evaluating a video signal comprising a plurality of video frames. In the plurality video frames, the number of pixels changed from one frame to the next are analysed and each frame is identified as being a repeat if a set proportion of the pixels present in the current frame match those present in the previous frame. The resultant pattern of repeat frames in the video signal is recorded. The resultant pattern is then scanned to determine whether or not a given repeat frame is part of a temporally repetitive pattern and those repeat frames not determined to be part of the temporally repetitive pattern are identified. As result of the above, video quality assessment is able to treat these two types of temporal artefact separately so as to distinguish between the almost invisible regular frame loss and the visually disturbing irregular frame loss.

The invention claimed is:

1. A method of evaluating a video signal comprising a plurality of video frames, the method comprising:
   (a) in the plurality video frames, analysing the number of pixels changed from one frame to the next;
   (b) identifying a frame as being a repeat if a set proportion of the pixels present in the current frame match those present in the previous frame;
   (c) recording a pattern of repeat frames in the video signal;
   (d) scanning the pattern to determine whether or not a given repeat frame is part of a temporally repetitive pattern; and generating an indicator of quality by identifying those repeat frames not determined to be part of the temporally repetitive pattern;
   (e) scanning the pattern by establishing a first window of multiple frames referenced in the pattern to a first frame and a second window of equal size in the pattern;
   (f) arranging the second window at an offset relative to the first window;
   (g) comparing the patterns of repeat frames in the first and second windows and recording the number of mismatches between the patterns;
   (h) repeating the comparison for each value of offset over range of offsets and recording the results;
   (i) selecting a new value of window size for the first and second windows, repeating the comparisons over the range of offset values and recording the results; and
   (j) determining a target window size that provides the least variation in mismatch values over the range of offset values.

2. A method, as claimed in claim 1, in which the indicator of quality is generated by comparing the pattern of repeat frames in a first section whose size is determined by the size of the target window with the pattern of repeat frames in a number of second sections of the same size and recording the number of times a mismatch occurs between the pattern in the first section and the patterns in each of the second sections.

3. A method, as claimed in claim 1, including combining the indicator of quality with one or more known indicators of quality to produce a perceived mean opinion score.

4. The method, as claimed in claim 1, in which the analysing is performed on a section of each frame.

5. The method, as claimed in claim 4, in which the section excludes the edges of the frame.

6. The method, as claimed in claim 1, in which each frame comprises a plurality of pixels, in which two pixels from adjacent frames are identified as matching if the pixel in the first frame is within a predetermined threshold of the corresponding pixel in the second frame.

7. The method, as claimed in claim 1, in which the decision mechanism uses a threshold on each pixel and if all pixels in a frame are within a predetermined threshold of the corresponding pixels in the previous frame, the frame is identified as a repeat.

8. A computer program or suite of programs recorded on a non-transitory computer-readable recording medium, arranged such that, when executed by a computer system, it/they cause/s the system to perform the method of claim 1.

9. A system for evaluating a video signal comprising a plurality of video frames, in which the system comprises:

means for detecting repeat frames by analysing the number of pixels changed from one frame to the next; and for recording a pattern of repeat frames;

means for scanning the pattern to determine whether or not a given repeat frame is part of a temporally repetitive pattern and for generating an indicator of quality by identifying those repeat frames not determined to be part of the temporally repetitive pattern;

in which the means for scanning the pattern comprises:

means for establishing a first window of multiple frames referenced in the pattern to a first frame and a second window of equal size in the pattern;

in which the second window is arranged at an offset relative to the first window;

in which the means for scanning the pattern further comprises:

means for comparing the patterns of repeat frames in the first and second windows and recording the number of mismatches between the patterns;

means for repeating the comparison for each value of offset over range of offsets and recording the results;

means for selecting a new value of window size for the first and second windows, repeating the comparisons over the range of offset values and recording the results; and means for determining a target window size that provides the least variation in mismatch values over the range of offset values.

10. A system as claimed in claim 9, comprising means for generating the indicator of quality by comparing the pattern of repeat frames in a first section whose size is determined by the size of the target window with the pattern of repeat frames in a number of second sections of the same size and for recording the number of times a mismatch occurs between the pattern in the first section and the patterns in each of the second sections.

11. A system as claimed in claim 9, comprising means for combining the indicator of quality with one or more known indicators of quality to produce a perceived mean opinion score.

12. A system as claimed in claim 9, in which the analysing is performed on a section of each frame.

13. A system as claimed in claim 12, in which the section excludes the edges of the frame.

14. A system as claimed in claim 9, in which each frame comprises a plurality of pixels, in which two pixels from adjacent frames are identified as matching if the pixel in the first frame is within a predetermined threshold of the corresponding pixel in the second frame.

15. A system as claimed in claim 9, in which the decision mechanism uses a threshold on each pixel and if all pixels in a frame are within a predetermined threshold of the corresponding pixels in the previous frame, the frame is identified as a repeat.

* * * * *